United States Patent
Christensen et al.

Patent Number: 6,042,031
Date of Patent: *Mar. 28, 2000

[54] CENTER PIVOT IRRIGATION SYSTEM

[75] Inventors: Dale A. Christensen, Arlington; Carl R. Ostrom, Omaha, both of Nebr.

[73] Assignee: Valmont Industries, Inc., Valley, Nebr.

[*] Notice: This patent is subject to a terminal disclaimer.

[21] Appl. No.: 09/152,855

[22] Filed: Sep. 14, 1998

[51] Int. Cl.[7] .................................................... B05B 3/12
[52] U.S. Cl. ............................................................ 239/729
[58] Field of Search ................................... 239/728, 729, 239/730, 731, 732, 733

[56] References Cited

U.S. PATENT DOCUMENTS

| | | | |
|---|---|---|---|
| 3,797,517 | 3/1974 | Kircher et al. | 137/344 |
| 3,802,627 | 4/1974 | Seckler et al. | 239/212 |
| 3,902,668 | 9/1975 | Daugherty et al. | 239/177 |
| 4,085,771 | 4/1978 | Hunter | 137/344 |
| 4,142,547 | 3/1979 | Courtright | 137/344 |
| 4,161,292 | 7/1979 | Holloway et al. | 239/11 |
| 4,227,648 | 10/1980 | Holloway et al. | 239/11 |
| 4,340,183 | 7/1982 | Kegel et al. | 239/710 |
| 4,432,494 | 2/1984 | Hunter | 239/177 CC |
| 4,434,936 | 3/1984 | Chapman | 239/178 |
| 4,508,269 | 4/1985 | Davis et al. | 239/177.2 |
| 4,569,481 | 2/1986 | Davis et al. | 239/177.2 |
| 4,674,681 | 6/1987 | Meis et al. | 239/1 |
| 4,729,514 | 3/1988 | Ostrom et al. | 239/727 |
| 4,795,099 | 1/1989 | Wolfbauer et al. | 239/733 |
| 5,435,495 | 7/1995 | Davis | 239/728 |
| 5,678,771 | 10/1997 | Chapman | 239/727 |
| 5,947,393 | 7/1999 | Unruh | 239/729 |

*Primary Examiner*—Steven O. Douglas
*Assistant Examiner*—Peter deVore
*Attorney, Agent, or Firm*—Zarley, McKee, Thomte Voorhees & Sease; Dennis L. Thomte

[57] ABSTRACT

An irrigation system is disclosed which includes a center pivot support having an elongated main water boom pivotally connected thereto which extends outwardly therefrom. An elongated extension boom is pivotally connected at its inner end to the outer end of the main boom and is supported by a steerable drive tower. A deflection sensor is positioned on the extension boom for sensing vertical deflection of the extension boom which is caused by relative movement of the main boom with respect to the extension boom. A control connects the deflection sensor with the drive for driving the steerable drive tower upon the deflection sensor sensing a predetermined amount of deflection of the extension boom.

5 Claims, 10 Drawing Sheets

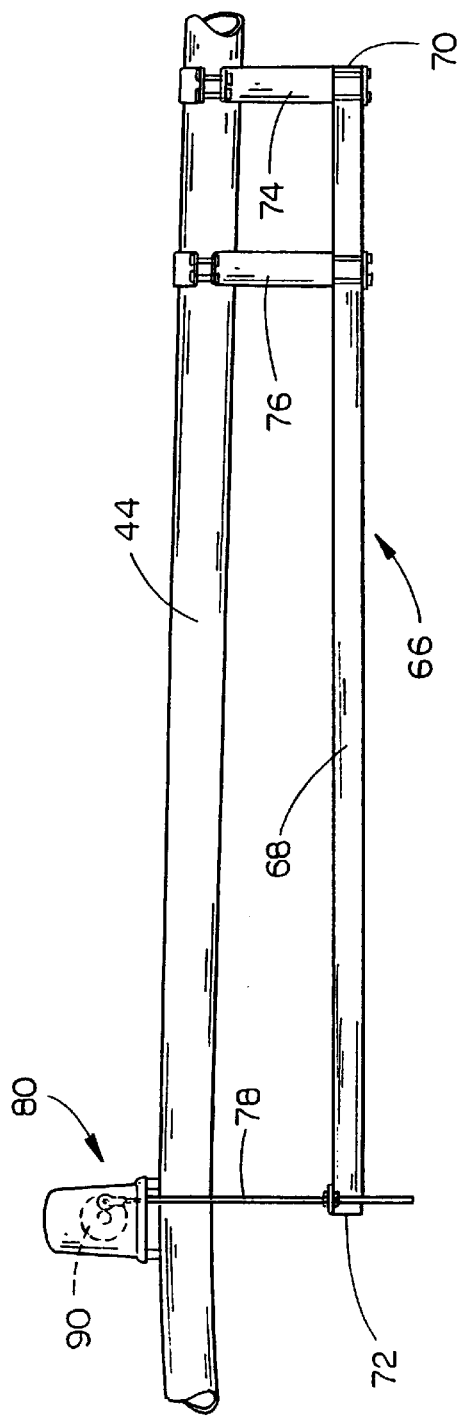
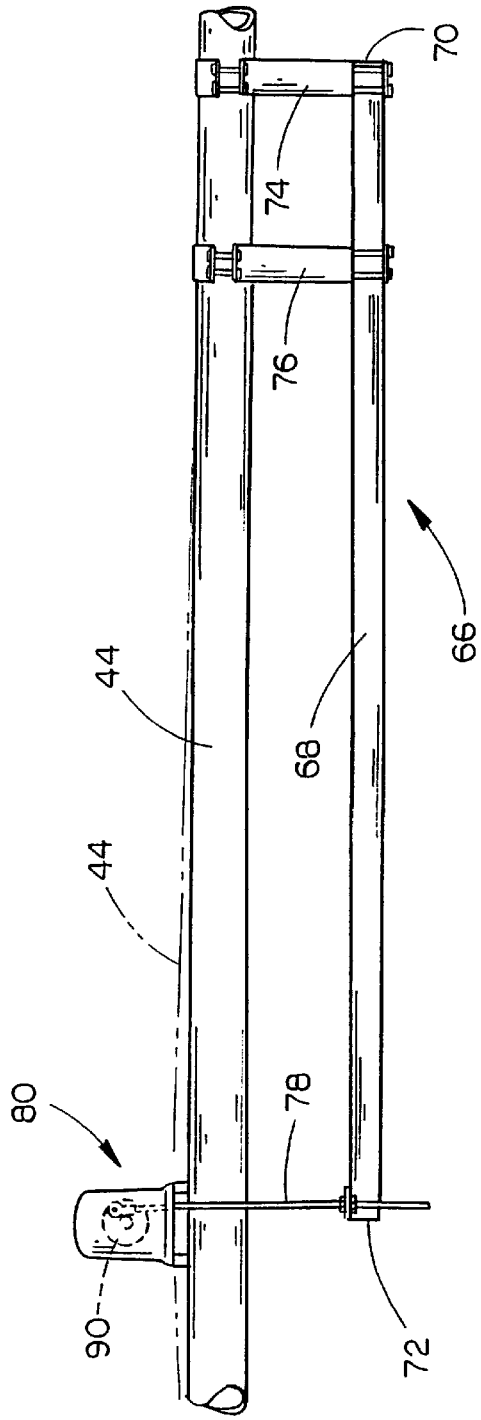
FIG. 7
FIG. 8

CENTER PIVOT IRRIGATION SYSTEM

BACKGROUND OF THE INVENTION

1. Field of the Invention

This invention relates to a center pivot irrigation system having the ability to irrigate the corners of the field being irrigated. More particularly, this invention relates to an improved means for controlling the movement of the corner span with respect to the center pivot portion of the system.

2. Description of the Related Art

Conventional center pivot irrigation systems comprise an elongated main boom pivotally connected at its inner end to a center pivot structure and extending outwardly therefrom. The main boom of the conventional center pivot irrigation system is comprised of a plurality of pipes connected together in an end-to-end fashion which are supported upon a plurality of drive towers. In most conventional center pivot irrigation systems, the outermost drive tower is the master tower with the other drive towers being selectively driven in response to angular displacement of the boom section adjacent thereto.

In the early 1970s, corner systems for center pivot irrigation systems were developed to enable the corners of a square field to be irrigated. See, for example, U.S. Pat. Nos. 3,797,517; 3,802,726; and 3,902,668. Corner systems usually consist of an extension boom or arm, sometimes referred to as a corner span, which is pivotally connected to the outer end of the main boom and which is supported on at least one steerable drive tower. A guidance system is provided for guiding or steering the extension tower, and extension boom, out into the corners of the field as the main arm travels around the field. Perhaps the most popular method of guiding the extension tower is the buried wire system described in U.S. Pat. No. 3,902,668. However, many different types of systems for driving the wheels of the extension tower have been previously provided. See, for example, U.S. Pat. Nos. 4,508,269 and 4,674,681. Further, in assignee's current production model, relative movement between the main boom and the extension boom is sensed with the drive wheels on the steerable drive tower on the extension boom being driven when the main boom has moved forwardly a predetermined distance with respect to the extension boom. When the extension boom "catches up" with the main arm, the driving of the drive wheels on the extension tower is discontinued. This process is continuously repeated during the movement of the system through the field.

Although the prior art systems do perform generally satisfactorily to drive the extension booms, it is believed that the instant invention is more reliable, more sensitive, and will require less maintenance than the prior art machines.

SUMMARY OF THE INVENTION

A center pivot irrigation system with a corner span attachment is described herein which includes a center pivot support structure located in the field to be irrigated. An elongated main water boom, having inner and outer ends, is pivoted at its inner end to the center pivot support structure and extends outwardly therefrom. The main water boom is comprised of an elongated main water pipe supported upon a plurality of non-steerable drive towers which propel the main water pipe around the center pivot support structure. An elongated extension boom (corner span, corner boom, corner arm), having inner and outer ends, is pivotally connected at its inner end to the outer end of the main boom with the extension boom comprising an elongated extension water pipe supported upon at least one steerable drive tower. A steering means is provided for steering the drive wheels on the steerable drive tower on the corner span as the main boom is moved through the field. A drive means is also provided for selectively driving the drive wheels on the steerable drive tower. A guidance means is provided for controlling the steering means whereby the steerable drive tower is moved along a preselected path, as the main boom travels over the field to be irrigated, thereby causing the extension boom to be pivotally moved with respect to the main boom to cause the extension boom to pivotally extend out into corner areas of the field being irrigated and pivotally retract therefrom as the main boom travels through the field.

The extension boom water pipe is normally bowed upwardly slightly by means of a conventional undertruss system as are the spans on the main arm. A deflection sensing means is positioned on the extension boom water pipe for sensing vertical deflection of the extension boom water pipe which is caused by movement of the main boom with respect to the extension boom. A control means connects the deflection sensing means and the drive means for driving the steerable drive tower upon the deflection sensing means sensing a predetermined amount of deflection of the extension water pipe. As the main boom moves with respect to the extension boom, the extension boom water pipe tends to be deflected vertically downwardly from its normal upwardly bowed position with the drive wheels on the steerable drive tower being actuated upon the sensing of a predetermined amount of downward deflection of the extension water pipe. Upon actuation of the drive wheels of the steerable drive tower on the extension boom, the extension boom moves towards the main boom and the extension boom water pipe tends to move upwardly to its normal upwardly bowed position, at which time the drive wheels on the steerable drive tower on the extension boom are deenergized.

It is therefore a principal object of the invention to provide an improved center pivot irrigation system having a corner arm system mounted thereon.

Still another object of the invention is to provide an improved method of controlling the driving of the corner arm extension boom mounted on the outer end of a center pivot irrigation system.

Still another object of the invention is to provide a device of the type described which eliminates a vast number of the moving parts of conventional corner arm driving means, thereby substantially reducing maintenance problems.

Still another object of the invention is to provide a system of the type described which is economical of manufacture and durable in use.

These and other objects will be apparent to those skilled in the art.

BRIEF DESCRIPTION OF THE DRAWINGS

FIG. 7 is a side view of the deflection sensing means of this invention illustrating the extension span in its normally upwardly bowed position;

FIG. 8 is a side view similar to FIG. 7 except that the extension span has been deflected downwardly from the position of FIG. 7;

DESCRIPTION OF THE PREFERRED EMBODIMENT

Figure 1:
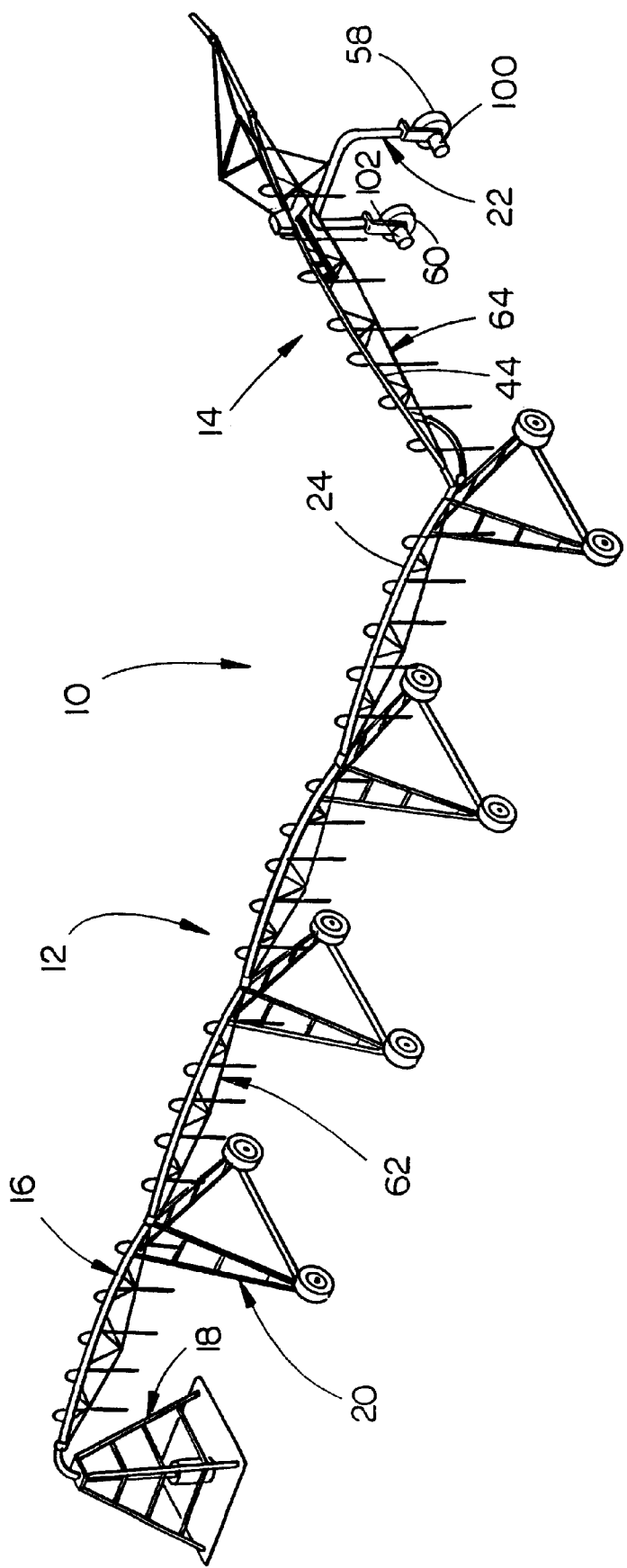
FIG. 1 is a perspective view of a center pivot irrigation system having a corner span pivotally mounted to the outer end thereof.

The numeral 10 refers generally to a self-propelled irrigation system which is comprised of a center pivot irrigation system 12 having a corner arm irrigation system, corner arm, corner span or extension boom 14 pivotally connected to the outer end thereof. Generally speaking, center pivot irrigation system 12 is of conventional design and includes a main arm or boom 16 which extends outwardly from a conventional center pivot structure 18. Main boom 16 is supported by a plurality of drive towers 20 in conventional fashion. The drive towers 20 are designed to propel the center pivot system around the center pivot structure 18 in conventional fashion. Corner irrigation system 14 is includes a steerable drive tower 22.

Figure 2:
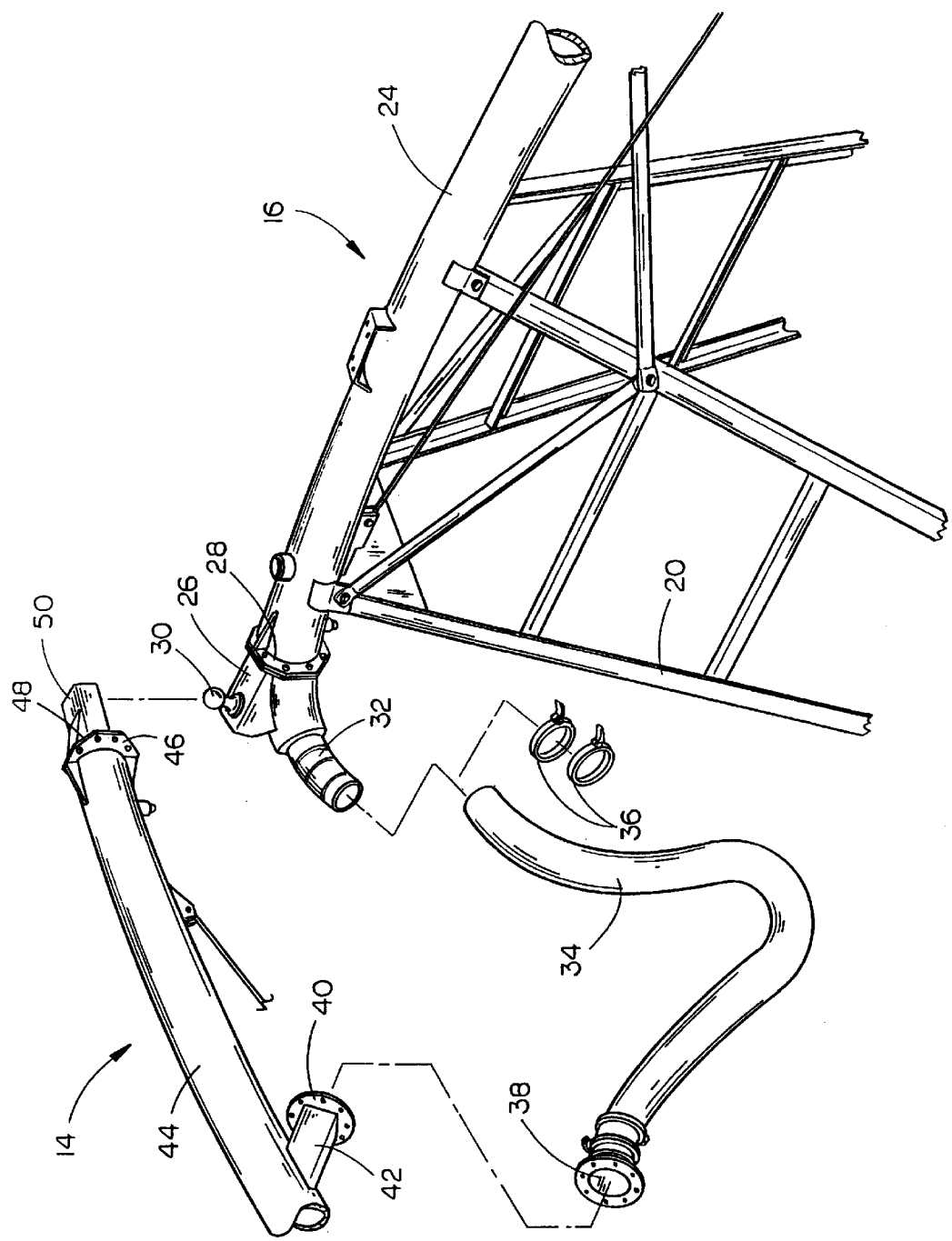
FIG. 2 is an exploded perspective view of the connection between the main boom and extension boom.
Figure 3:
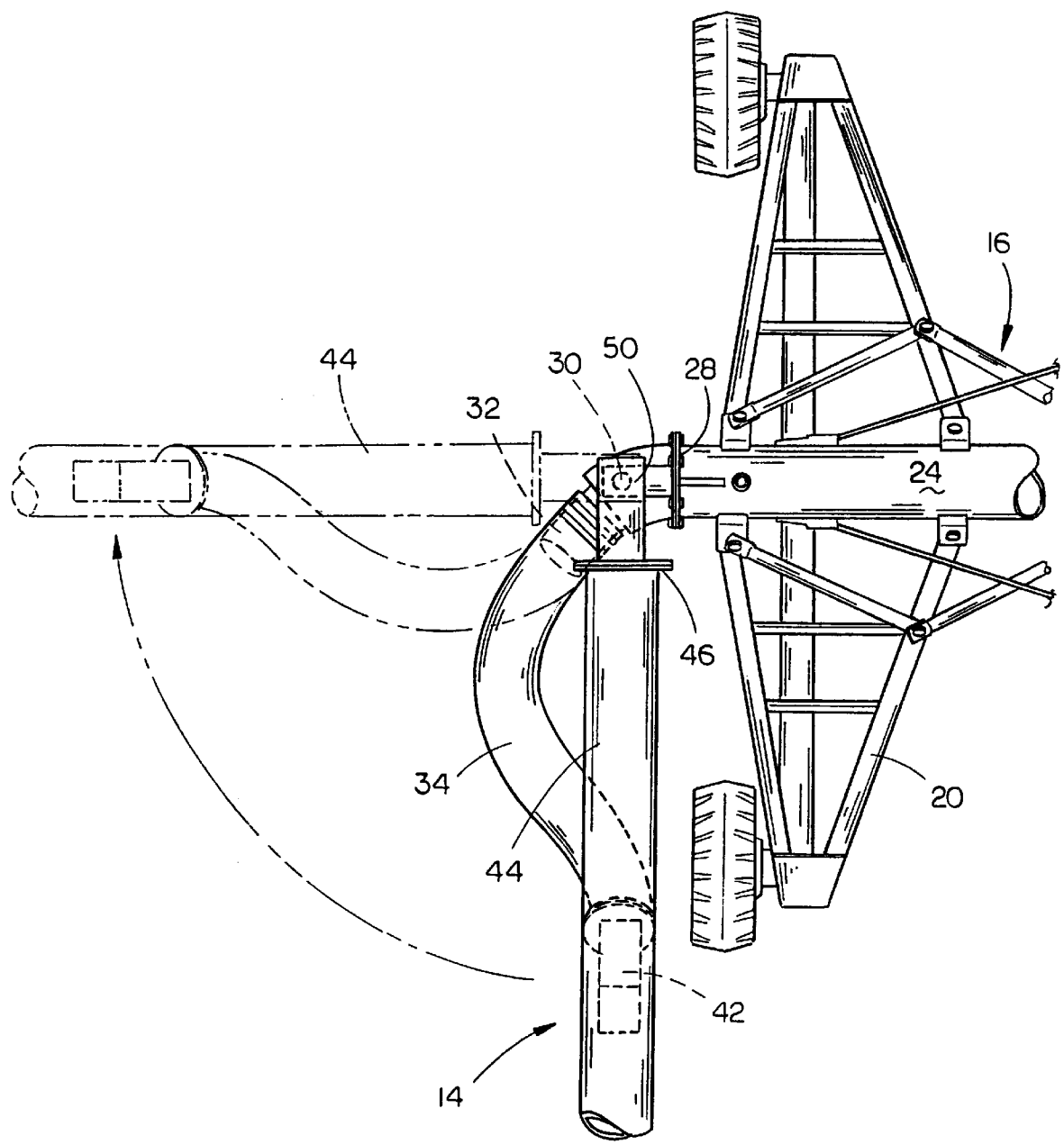
FIG. 3 is a top elevational view of the connection of FIG. 2 with the broken lines illustrating the corner arm water conduit in its completely extended position.
Figure 4:
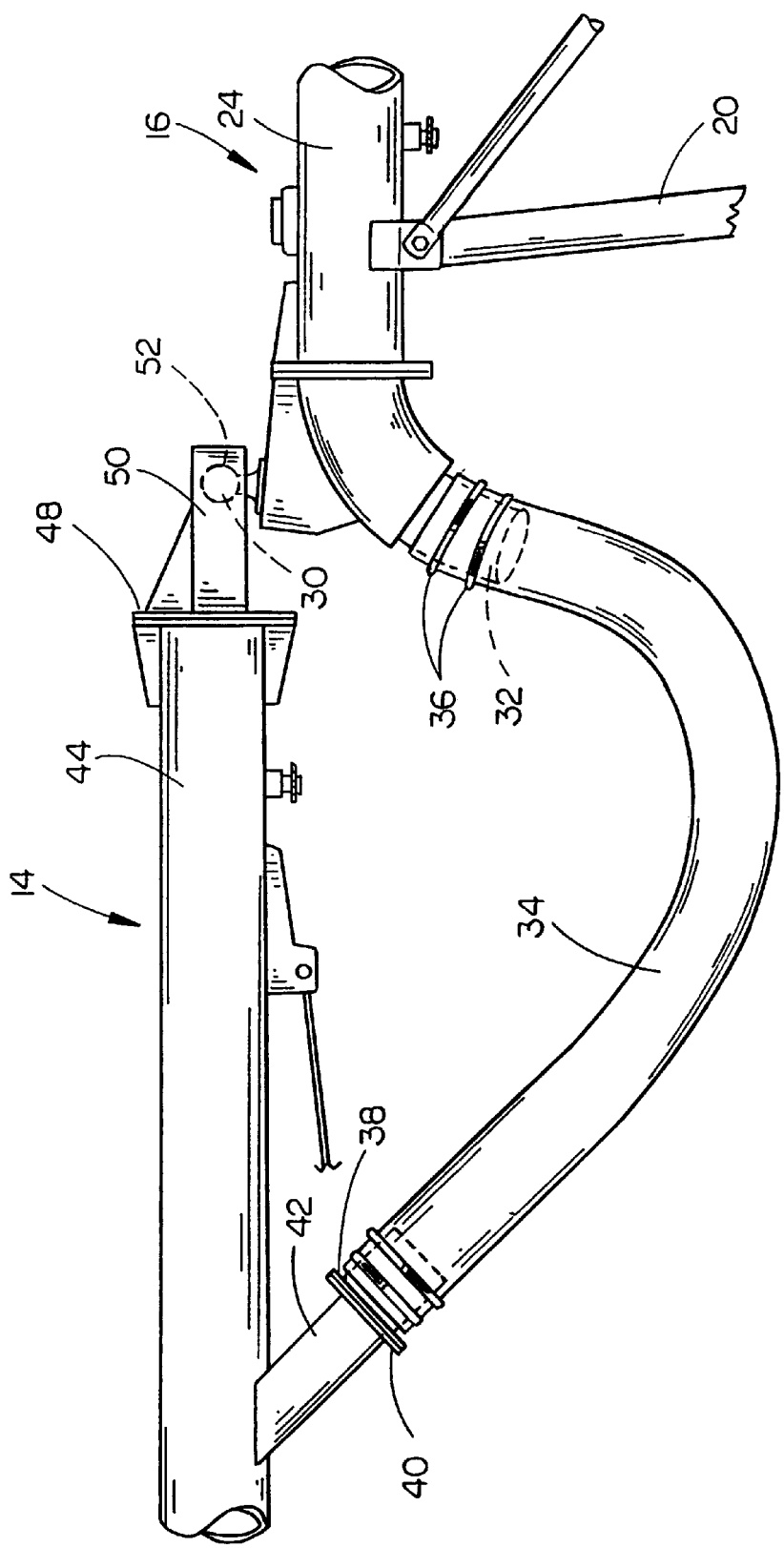
FIG. 4 is a side elevational view of the connection of FIG. 2.
Figure 5:
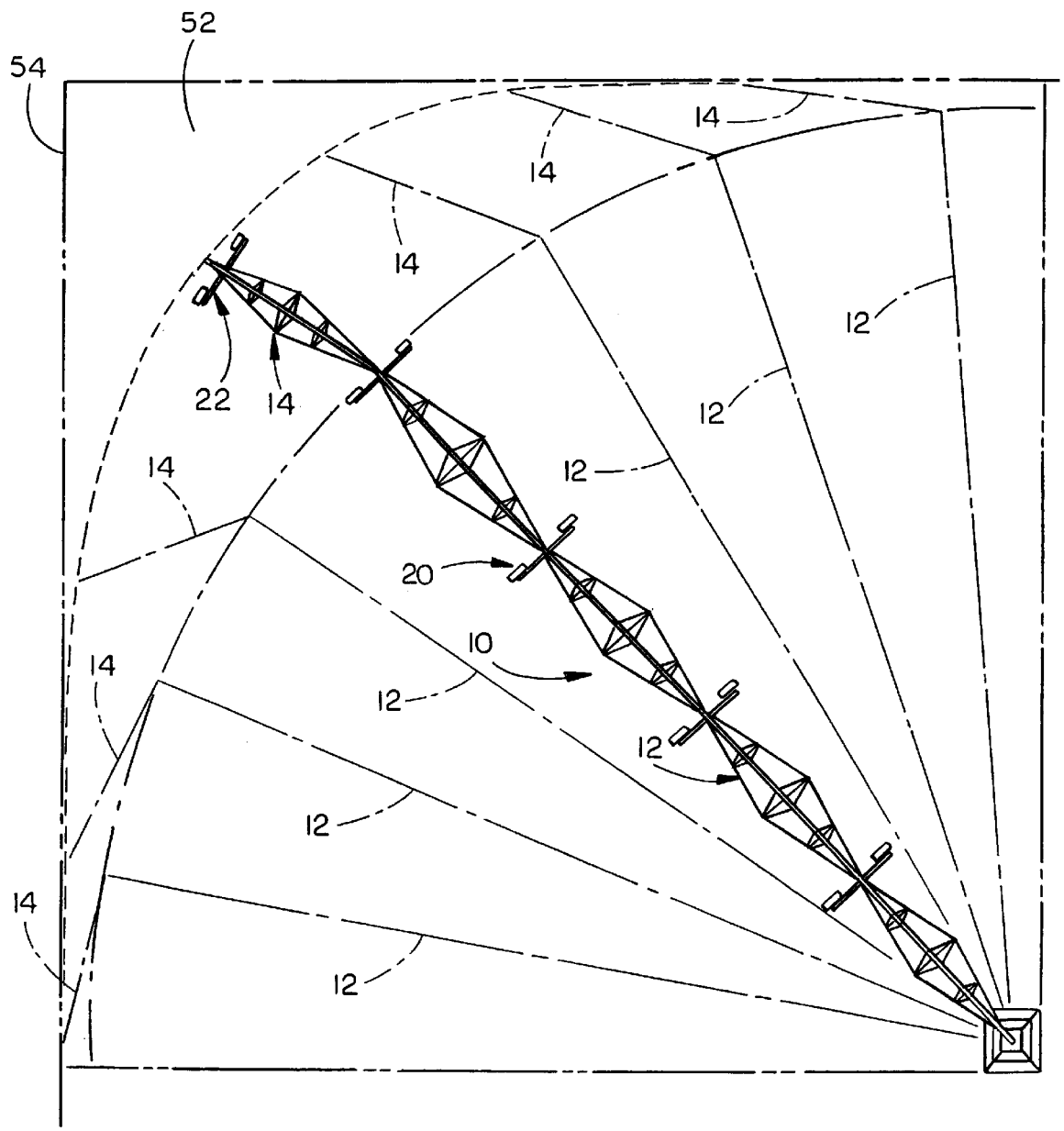
FIG. 5 is a plan view illustrating the corner arm irrigation system of this invention.
Figure 6:
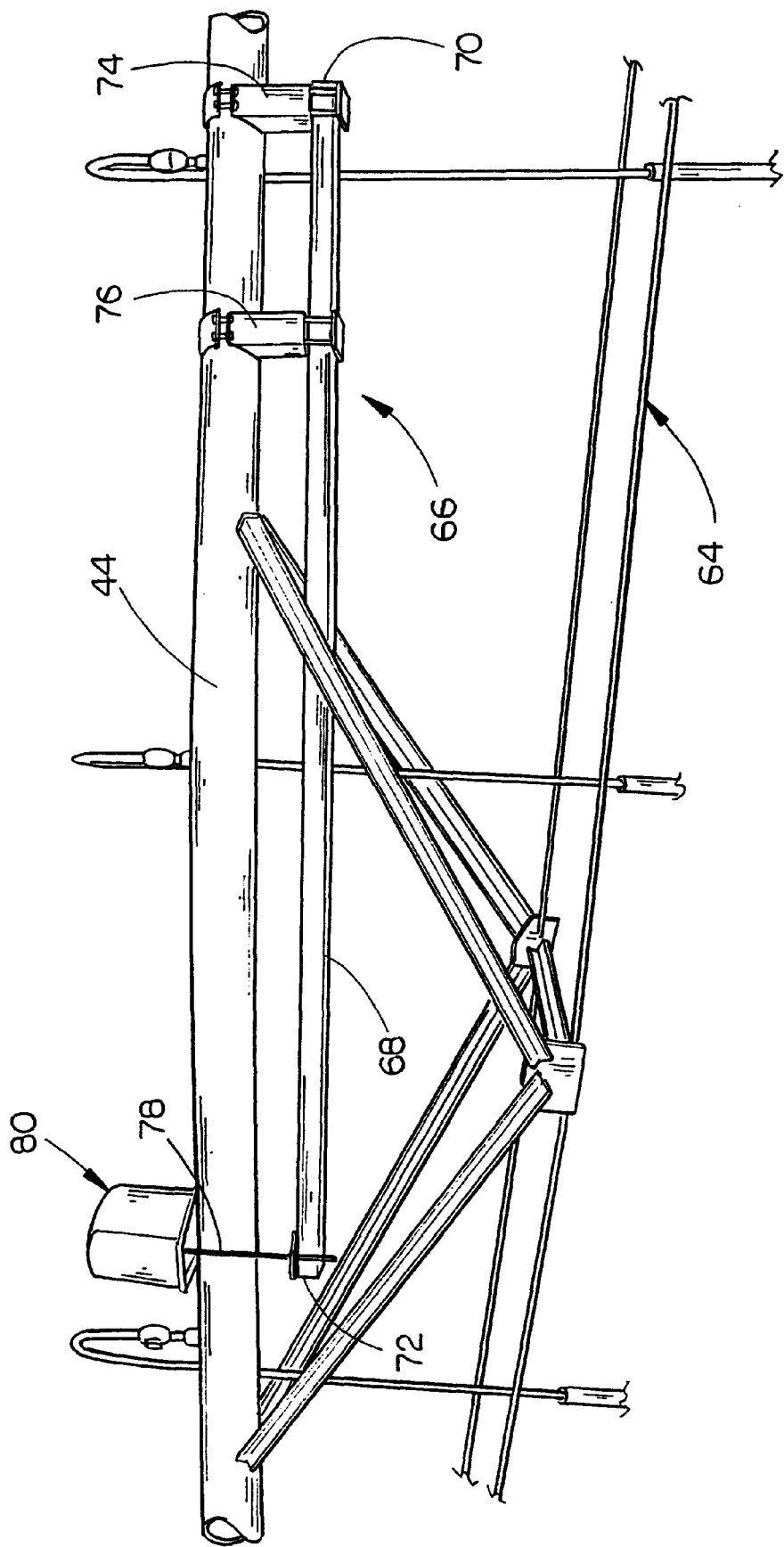
FIG. 6 is a perspective view of the deflection sensing means of this invention.
Figure 9:
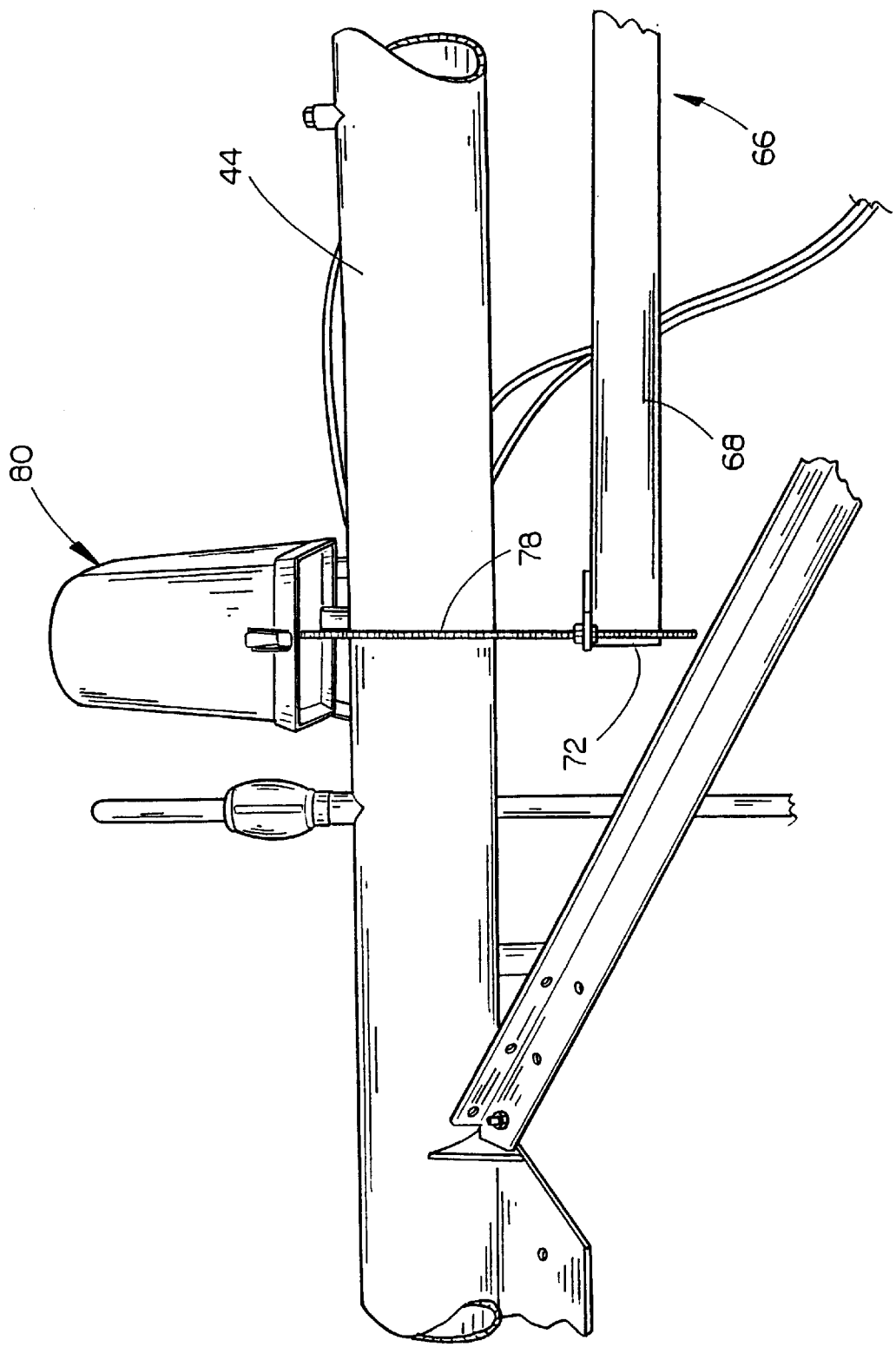
FIG. 9 is a partial bottom perspective view of one end of the deflection sensing means.

Referring to FIG. 2, the numeral 24 refers to the outermost pipe section of the main boom 16. Support 26 is secured to the annular plate 28 mounted at the outer end of pipe section 24 and has a hitch ball 30 mounted thereon. Support 26 includes an arcuate pipe or elbow section 32 which extends downwardly, outwardly and rearwardly from the pipe section 24, as seen in FIG. 2. One end of connecting hose 34 is mounted on elbow 32 and is maintained thereon by conventional retainers 36. The other end of hose 34 has a flanged pipe 38 secured thereto which is adapted to be secured to the flange 40 which is mounted on the lower inner end of tubular member 42 which extends downwardly from the inner end of the water conduit 44 of corner arm 14. The inner end of water conduit or pipe 44 of extension arm system 14 is provided with an annular flange 46 which is sealed by means of plate 48 having beam 50 extending therefrom. The underside of beam 50 is provided with a ball-shaped pocket 52 which is adapted to receive the hitch ball 30, as illustrated in FIG. 4. As illustrated in FIG. 5, the corner arm 14 trails the main boom 12 and is moved out into the corner 52 of the field 54 so that the corners of the field may be irrigated, as will be described hereinafter.

As stated, the numeral 14 refers to a corner arm system or extension arm system including the extension water pipe 44 which is supported by at least one steerable drive tower 22 including a pair of steerable drive wheels 58 and 60. The drive wheels 58 and 60 are steered by any convenient means such as the system disclosed in U.S. Pat. No. 3,902,668 so that the extension boom will be pivotally moved with respect to the main boom to cause the extension boom to pivotally extend out into corner areas of the field and pivotally retract therefrom as the main boom travels through the field, as seen in FIG. 5. The electric motors on the drive wheels 58 and 60 may be variable speed or the "on" and "off" type, as desired.

In most center pivot irrigation systems, the outermost drive tower is the master tower with the drive towers inwardly therefrom being slave towers. In other words, the outermost master drive tower is driven at the preselected speed or percentage of time with the other drive towers being actuated by conventional alignment means so that the main boom remains in generally longitudinal alignment.

As the main boom 16 is moved through the field, the drive wheels 58 and 60 on the tower 22 must be driven so that the extension boom "keeps up" with the main boom. In most prior art corner systems, many moving parts are provided between the outer end of the main boom and the inner end of the extension arm. The means for controlling the driving of the drive wheels on the corner drive tower also involves several moving parts which require considerable maintenance. In an effort to eliminate the prior art maintenance problems of the means for driving the drive tower on the extension boom, the instant invention has been provided.

As seen in FIG. 1, the main boom 12 includes an undertruss system 62 which bows the water pipes between drive towers 20 upwardly. A suitable undertruss system 64 is also provided on the extension arm 14 which normally bows the extension water pipe 44 upwardly to the configuration or shape as seen in FIG. 7. A deflection sensing means 66 is provided on the extension water pipe which senses the vertical deflection of the extension water pipe to control the driving of the drive wheels 58 and 60 on the extension drive tower 22.

Deflection sensing means 66 includes an elongated beam 68 which is positioned beneath extension water pipe 44 in a horizontally disposed position and which includes an inner end 70 and an outer end 72. A pair of supports 74 and 76 secure the inner end of the beam 68 to the water pipe 44, as seen in the drawings. An externally threaded rod 78 is vertically adjustably secured to the outer end 72 of beam 68 and extends upwardly therefrom to a control means generally referred to by the reference numeral 80. Control means 80 includes a pair of vertically disposed support plates 82 and 84 having a plurality of spacer bolts 86 extending therebetween.

Shaft 88 is rotatably mounted in and extends between plates 82 and 84 and has cam 90 mounted thereon for rotation therewith. One end of shaft 88 extends through plate 82 and is connected to a conventional potentiometer 92 whereby rotation of shaft 88 causes the electrical potential of potentiometer 92 to be either increased or decreased depending upon the direction of rotation of shaft 88. Cam 90 has a shaft or stub 94 extending therefrom which rotatably receives the upper end of a connector 96. The lower end of connector 96 threadably receives the upper end of rod 78. The numeral 98 refers to a safety switch mounted on the inside surface of plate 82 above cam 90 which is actuated by cam 90 to deactivate the entire electrical system should the extension boom 14 fail to maintain its proper operating position with respect to the main boom 12. Safety switch 98 includes switches 99 and 101 which are engaged and actuated by cam plates 103 and 105 should the corner span 14 fall too far behind main boom 12 or too far ahead of main boom 12, respectively, to deactivate the electrical system on the irrigation system.

Figure 10:
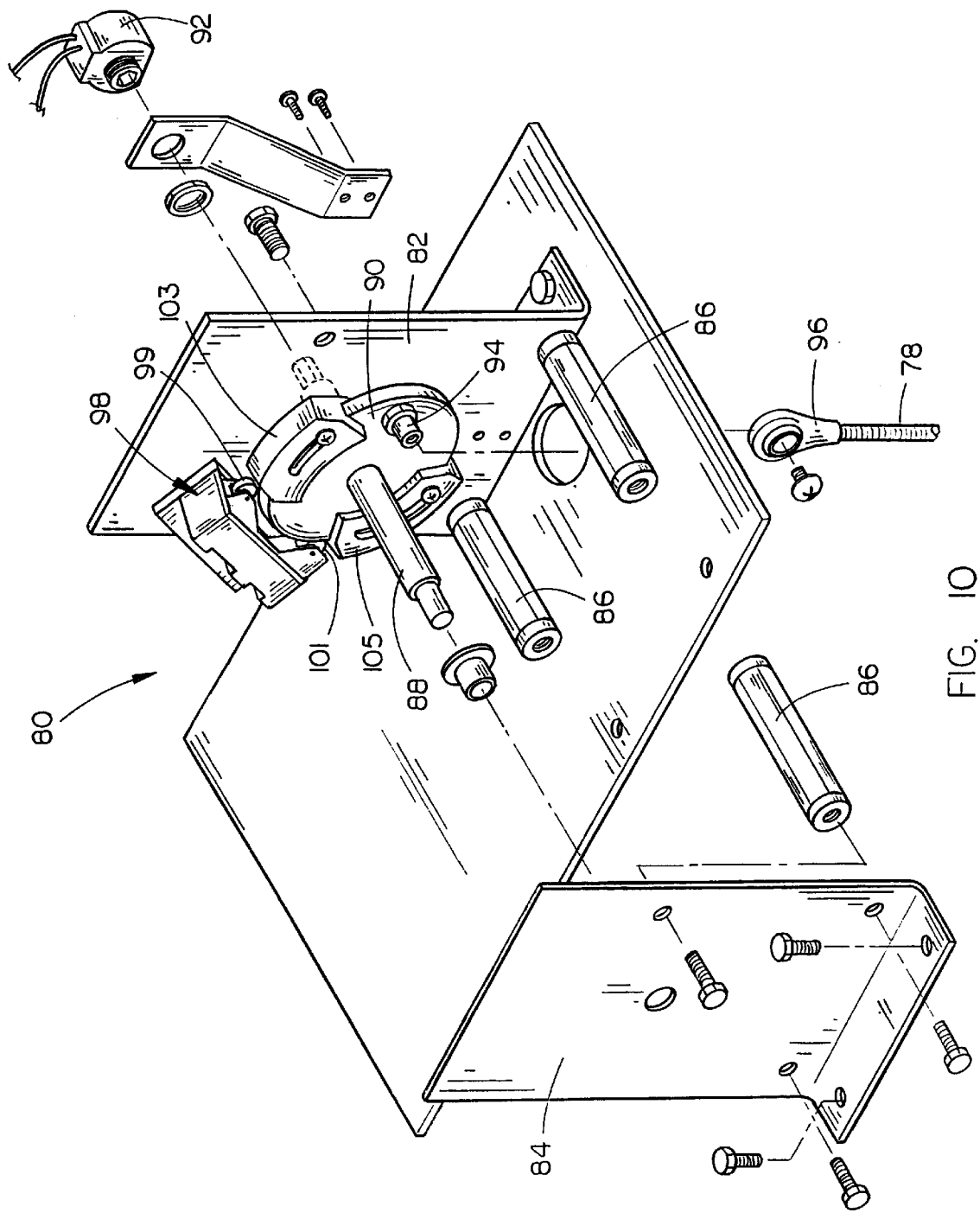
FIG. 10 is an exploded perspective view of the control portion of the deflection sensing means.
Figure 11:
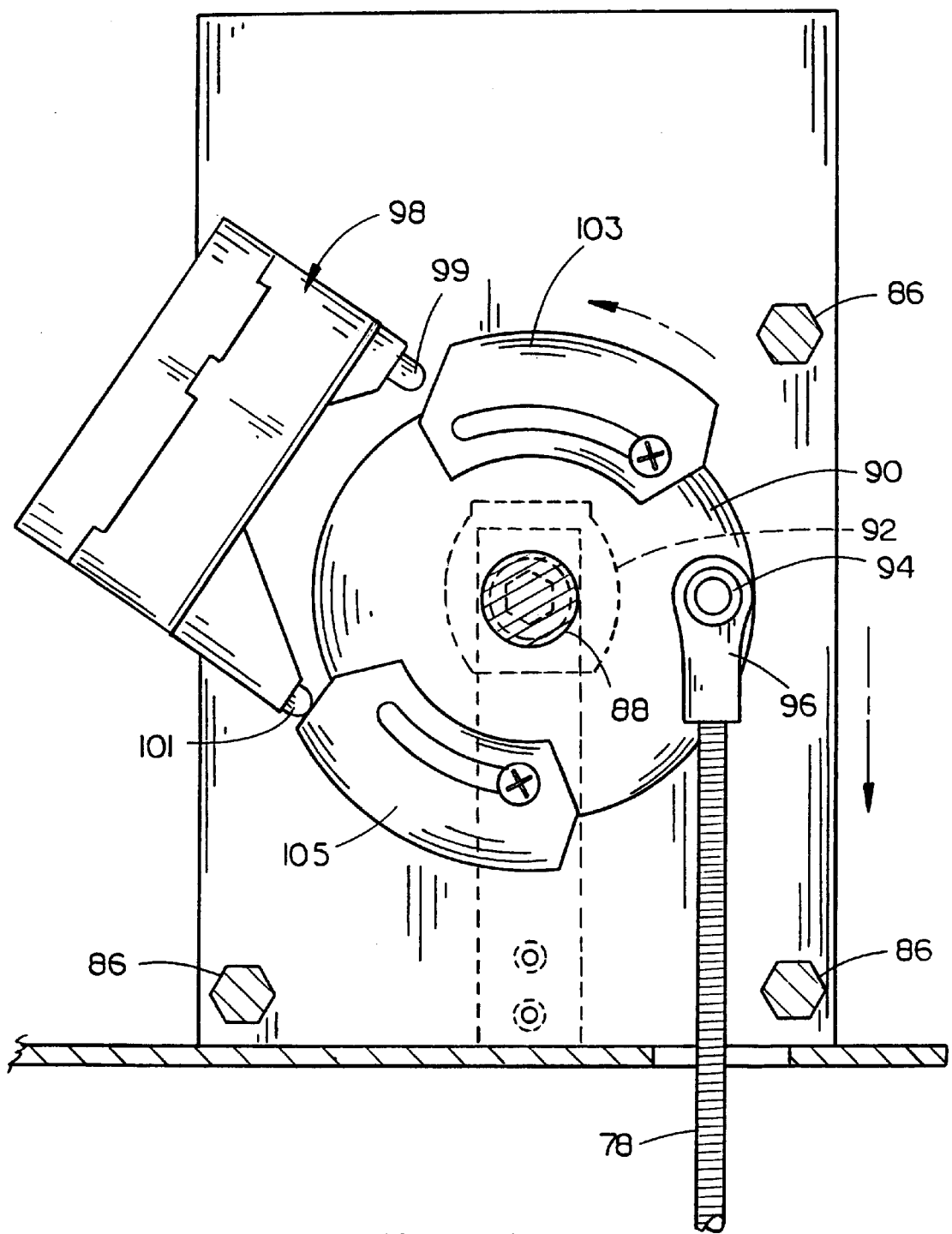
FIG. 11 is a side elevational view of the control portion of FIG. 10.

The potentiometer 92 is suitably electrically connected to the controls for the drive motors 100 and 102 for drive wheels 58 and 60, respectively, whereby the driving of the drive wheels 58 and 60 are controlled by the deflection sensing means 66, as will now be described. As the main boom 16 is propelled around the center pivot structure 18 by the drive towers 20 in conventional fashion, the extension boom 14 is driven and steered by the drive wheels 58 and 60 and follows along behind the main boom 16 and is guided out into the corners of the field by the guidance system previously described. As the main boom 16 moves away from the extension boom 14, the extension water pipe 44 goes into tension and tends to lose its upwardly bowed configuration of FIG. 7 which causes control means 80 to move downwardly with respect to control rod 78, thereby causing cam 90 to be rotated in a counterclockwise direction, as viewed from the left in FIG. 10, which results in the potentiometer 92 being actuated which in turn actuates the drive motors 100 and 102 on drive wheels 58 and 60 to cause the extension boom 16 to be moved relative to main boom 12 so that the extension water pipe 56 tends to bow upwardly towards its normal position which in turn causes cam 90 to be rotated to rotate potentiometer 92 in an opposite direction to that described hereinabove. The upward and downward bowing or deflection of the water pipe 56 is constantly repeated to control the driving of the drive wheels 58 and 60. As stated, the drive motors 100 and 102 may be of the variable speed type or the "on" and "off" type.

The deflection sensing means of the invention eliminates the large number of moving parts normally associated with corner systems driving controls, thereby substantially reducing maintenance problems. It is also believed that the system disclosed herein is more sensitive and reliable than the prior art systems.

Thus it can be seen that the invention accomplishes at least all of its stated objectives.

We claim:

1. An irrigation system, comprising:

a center pivot support structure;

an elongated main water boom, having inner and outer ends, pivoted at its inner end to said center pivot support structure and extending outwardly therefrom;

said main water boom comprising an elongated main water pipe supported upon at least one non-steerable drive tower which propels said main water pipe around said center pivot support structure;

an elongated extension boom, having inner and outer ends, pivotally connected at its said inner end to said outer end of said main boom;

said extension boom comprising an elongated extension water pipe supported upon at least one steerable drive tower;

steering means for steering said steerable drive tower;

drive means for driving said steerable drive tower;

guidance means for controlling said steering means so that said steerable drive tower is moved along a preselected path, as said main boom travels over the field to be irrigated, thereby causing said extension boom to pivotally move with respect to said main boom to cause said extension boom to pivotally extend out into corner areas of the field and pivotally retract therefrom as said main boom travels through the field;

a deflection sensing means positioned on said extension water pipe for sensing deflection of said extension water pipe which is caused by movement of said main water boom with respect to said extension boom;

control means connecting said deflection sensing means and said drive means for driving said steerable drive tower upon said deflection sensing means sensing a predetermined amount of deflection of said extension water pipe.

2. The irrigation system of claim 1 wherein said deflection sensing means is positioned on said extension pipe adjacent said steerable drive tower.

3. The irrigation system of claim 1 wherein said deflection sensing means includes means for sensing relative vertical deflection of said extension water pipe.

4. The irrigation system of claim 1 wherein said deflection sensing means comprises an elongated beam having inner and outer ends and being positioned beneath said extension water pipe and having its inner end secured to said extension water pipe; an elongated rod secured to the outer end of said beam and extending upwardly therefrom; a support mounted on said extension water pipe above said outer end of said beam; a horizontally disposed shaft rotatably mounted on said support; the upper end of said rod operatively connected to said shaft whereby downward movement of said support, with respect to said outer end of said beam, causes said shaft to rotate in a first direction and whereby upward movement of said support, with respect to the outer end of said beam, causes said shaft to rotate in a second direction which is opposite to said first direction; said control means including an electronic control operatively connected to said shaft for sensing the rotation of said shaft for controlling the driving of said steerable drive tower.

5. The irrigation system of claim 4 wherein a safety shut-off is operatively connected to said shaft.

* * * * *